(12) United States Patent
Carlson

(10) Patent No.: US 6,917,852 B2
(45) Date of Patent: Jul. 12, 2005

(54) AUTOMATED INPUT/OUTPUT JOB DISTRIBUTION THROUGH THE USE OF MOBILE INPUT/OUTPUT BINS

(75) Inventor: Gerard J. Carlson, Boise, ID (US)

(73) Assignee: Hewlett-Packard Development Company, L.P., Houston, TX (US)

(*) Notice: Subject to any disclaimer, the term of this patent is extended or adjusted under 35 U.S.C. 154(b) by 20 days.

(21) Appl. No.: 10/735,384

(22) Filed: Dec. 12, 2003

(65) Prior Publication Data

US 2004/0128024 A1 Jul. 1, 2004

Related U.S. Application Data

(63) Continuation-in-part of application No. 10/057,686, filed on Jan. 24, 2002, now Pat. No. 6,681,147.

(51) Int. Cl.[7] .............................. G06F 7/00; G08B 23/00
(52) U.S. Cl. ........................ 700/224; 700/223; 340/500; 340/612
(58) Field of Search ................................ 700/213, 223, 700/224, 500; 340/612, 613, 679, 988; 235/384

(56) References Cited

U.S. PATENT DOCUMENTS

| | | | |
|---|---|---|---|
| 4,007,843 A | 2/1977 | Lubbers et al. | |
| 4,688,678 A | 8/1987 | Zue et al. | |
| 4,894,908 A | 1/1990 | Haba, Jr. et al. | |
| 5,342,034 A | 8/1994 | Mandel et al. | |
| 5,431,600 A | 7/1995 | Murata et al. | |
| 5,525,031 A | 6/1996 | Fox | |
| 5,629,672 A | 5/1997 | Brown et al. | |
| 5,793,298 A | 8/1998 | Matsuura | |
| 5,803,704 A | 9/1998 | Lazzarotti | |
| 5,896,297 A | 4/1999 | Valerino, Sr. | |
| 5,961,571 A | 10/1999 | Gorr et al. | |
| 5,990,437 A | 11/1999 | Coutant et al. | |
| 6,006,237 A | 12/1999 | Frisbey | |
| 6,060,992 A | 5/2000 | Huang et al. | |
| 6,126,053 A | 10/2000 | Shaver | |
| 6,168,145 B1 | 1/2001 | Tanaka et al. | |
| 6,202,004 B1 | 3/2001 | Valerino, Sr. | |
| 6,459,061 B1 | 10/2002 | Kugle et al. | |
| 6,460,681 B1 | 10/2002 | Coutant et al. | |
| 6,744,362 B2 * | 6/2004 | Carlson | 340/500 |
| 6,747,229 B2 * | 6/2004 | Carlson | 700/224 |
| 2003/0140181 A1 | 7/2003 | Carlson | |

* cited by examiner

*Primary Examiner*—Gene O. Crawford
(74) *Attorney, Agent, or Firm*—James R. McDaniel

(57) ABSTRACT

This invention relates to self-propelled, mobile input/output bins (MIOB). Such structures of this type, generally, allow the MIOB to provide an automated input/output job distribution. For example, the MIOB can provide a method for automated input/output job distribution, comprising the steps of: detecting an input/output job at a consumable handling device; interacting between said consumable handling device and a first self-propelled, mobile input/output bin; and contacting a second self-propelled, mobile input/output bin by said first input/output bin when said first input/output bin becomes full.

23 Claims, 2 Drawing Sheets

AUTOMATED INPUT/OUTPUT JOB DISTRIBUTION THROUGH THE USE OF MOBILE INPUT/OUTPUT BINS

CROSS-REFERENCE TO A RELATED APPLICATION

This continuation-in-part (CIP) Patent Application is related to U.S. patent application Ser. No. 10/057,686, filed on Jan. 24, 2002, now U.S. Pat. No. 6,681,147.

FIELD OF THE INVENTION

Such structures of this type, generally, allow the MIOB to provide an automated input/output job distribution. For example, the MIOB can provide a method for automated input/output job distribution, comprising the steps. This invention relates to self-propelled, mobile input/output bins (MIOB). of: detecting an input/output job at a consumable handling device; interacting between said consumable handling device and a first self-propelled, mobile input/output bin; and contacting a second self-propelled, mobile input/output bin by said first input/output bin when said first input/output bin becomes full.

DESCRIPTION OF THE RELATED ART

As printer manufacturers move into the larger, higher speed pages per minute market, the printers will need more attention from the data center or other technical support personnel. For example, it is common that high-speed printers can consume a ream of paper every 10 minutes. Consequently, even with a 2500 page input bin, this high-speed printer will need paper replenishment in less than an hour. To compound this even further, the output bin is an even larger problem because it may need to be emptied several times an hour. Therefore, a more advantageous system, then, would be presented if a self-propelled, mobile input/output bin (MIOB) could be utilized to service these higher volume printers.

It is known, in the printing art, to employ an automated print job distribution system for a shared user centralized printer. Exemplary of such prior art is U.S. Pat. No. 5,525,031 ('031) to E. D. Fox, entitled "Automated Print Jobs Distribution System for Shared User Centralized Printer." While the '031 reference teaches the use of a mobile, vehicular mail boxing module that interacts with a printer in order to collect and distribute print jobs, it does not teach, suggest or even appreciate the use of a MIOB that interacts with all types of printers and/printing devices, such as scanners, facsimile machines, copiers, printers and printing devices.

Finally, it is known to employ a variety of communication systems that allow for communication between a central control station and automated guided vehicles (AGVs). Exemplary of such prior art is U.S. Pat. No. 4,894,908 ('908) to A. R. Haba, Jr. et al., entitled "Method of Automated Assembly of Assemblies Such As Automotive Assemblies and System Utilizing Same." While the '908 reference discloses the use of a communication system between a cell controller and an AGV, it does not teach, suggest or even appreciate the use of a communication system that allows a MIOB to communicate with a MIOB.

It is apparent from the above that there exists a need in the art for an input/output job distribution system for a printer or other such consumable handling devices, which at least equals the print job distribution systems of the prior art, but which at the same time employs the use of a self-propelled MIOB that can interact with all types of printers and/or printing devices. It is a purpose of this invention to fulfill this and other needs in the art in a manner more apparent to the skilled artisan once given the following disclosure.

SUMMARY OF THE INVENTION

Generally speaking, this invention fulfills these needs by providing a method for automated input/output job distribution, comprising the steps of: detecting an input/output job at a consumable handling device; interacting between said consumable handling device and a first self-propelled, mobile input/output bin; and contacting a second self-propelled, mobile input/output bin by said first input/output bin when said first input/output bin becomes full. In certain preferred embodiments, the consumable handling device can be, but is not limited to, a printer, a printing device, a media handling device or the like. Also, the input/output job can be, but is not limited to, a print job, a scan job, a fax, a copy or the like.

In another further preferred embodiment, the self-propelled, mobile input/output bin (MIOB) provides a fast, efficient means to transfer the input/output job between various MIOBs without having to involve other support personnel.

The preferred method, according to this invention, offers the following advantages: ease of input/output job transfer; improved economy; increased efficiency; and reduced downtime. In fact, in many of the preferred embodiments, these factors of ease of input/output job transfer, increased efficiency and reduced downtime are optimized to an extent that is considerably higher than heretofore achieved in prior, known output job distribution systems.

The above and other features of the present invention, which will become more apparent as the description proceeds, are best understood by considering the following detailed description in conjunction with the accompanying drawings, wherein like characters represent like parts throughout the several views and in which:

DETAILED DESCRIPTION OF THE INVENTION

Figure 1:
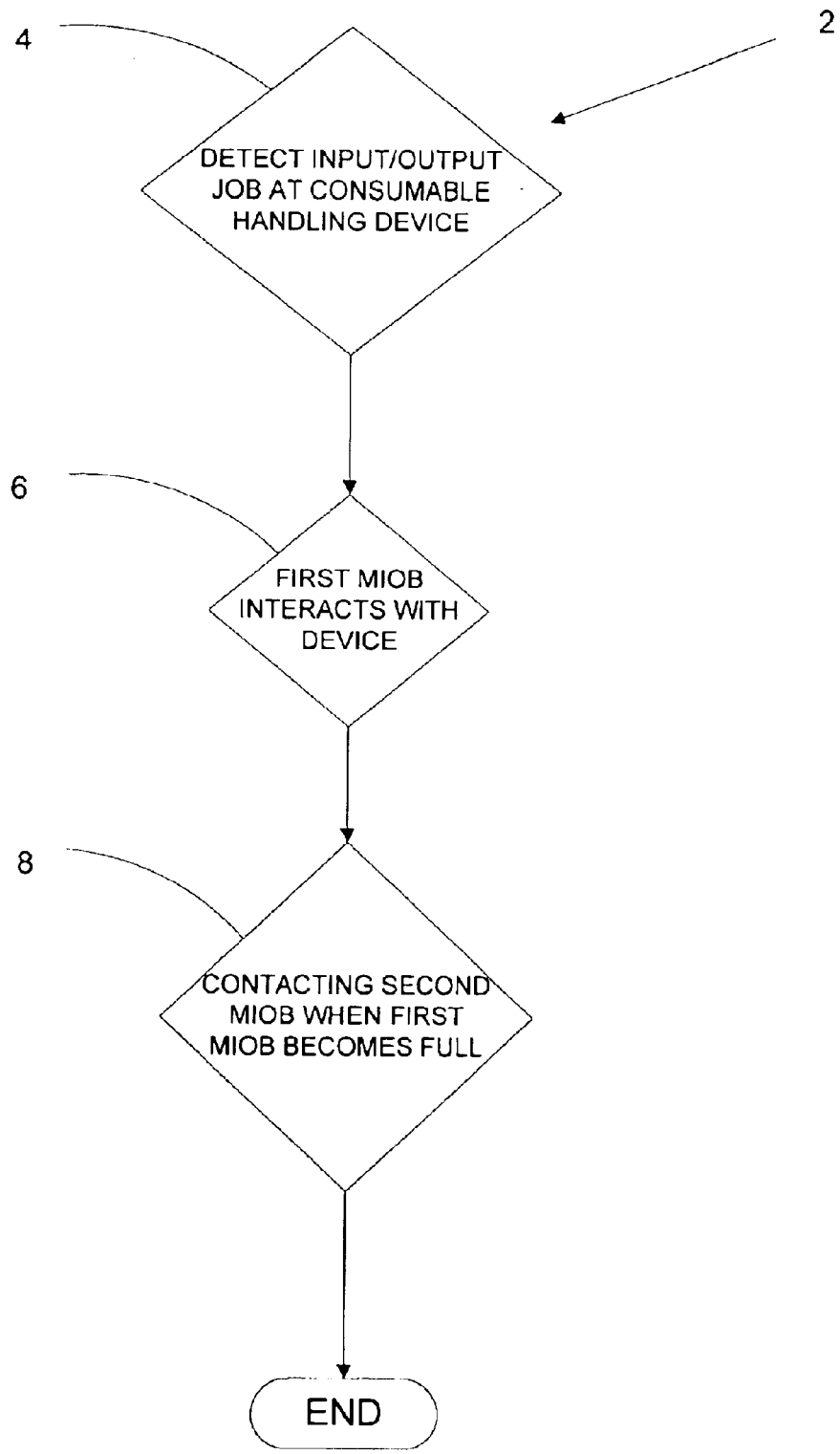
FIG. 1 is a flowchart that illustrates a method for automated input/output job distribution through the use of a self-propelled, mobile input/output bin (MIOB)

With reference to FIG. 1, there is illustrated one preferred embodiment for use of the concepts of this invention. Method 2 includes, for example, the steps of detecting an input/output job at the consumable handling device (step 4), interacting between the mobile, input/output bin (MIOB) and the consumable handling device (step 6), and contacting a second MIOB when the first MIOB becomes full (step 8). In this manner, both MIOBs can be used to transfer the print job to the second media-handling device.

It is to be understood that a list of input/output jobs may include, but is not limited to, a print job, a copy job, a scan job, a fax and/or or the like. It is also to be understood that a typical consumable handling device can be, but is not limited to, a printer, a printing device, a media handling device and/or the like. Finally, it is to be understood that the phrase "printing device" can be, but is not limited to, facsimile machines, scanners, plotters or the like.

With respect to the MIOB, it is envisioned that this device be a lightweight, autonomous, wheeled, cart-type robot that conventionally operates off of conventional, rechargeable batteries. During periods of use, the MIOB finds a docking station to conventionally recharge and possibly conventionally plug into a network link to exchange data with other MIOBs, printers, mailboxes or servers. The MIOB of the present invention is similar in some respects to the mailroom robots discussed above. However, a significant difference is that the MIOB of the present invention is designed to service all types of consumable handling devices, not just printers.

It is to be understood that the MIOB can be outfitted so as to service various consumable handling devices. For example, the MIOB can be equipped with a locked bin that provides security as the input/output job is transferred between the media handling devices. Another MIOB can be fitted with a conventional location device so that the location/destination of the MIOB can be constantly monitored.

A further advantageous aspect of the present invention will now be described with respect to the present invention. If a MIOB has been sent to empty a full output bin of a printer and the MIOB gets to the printer and it is determined that another MIOB is needed due to the large amount of output, the MIOB can communicate back to the data center to send another similar MIOB. It is to be understood that the first MIOB can transfer output from its lockable bin to the lockable bin of the second MIOB.

A still further advantageous aspect of the present invention will now be described with respect to the passive/active nature of the present invention. For example, if a printer prints a print job, the printer can conventionally contact a data center (not shown) and inform the data center that that particular printer has a print job to be picked up. The data center then contacts a first MIOB and provides the first MIOB with information as to the location of the printer and the location of the other media-handling device where the print job is to be delivered. The first MIOB proceeds to that printer and picks up the print job. The first MIOB transfers the print job to the second media-handling device, such as a copier if the print job is to be copied. While the copier example has been used, it is to be understood that the MIOB could also be used to transfer the print job to a scanner, a facsimile machine, another printer or the like. It is to be understood that the first MIOB can interact with a second MIOB when the first MIOB becomes full, for example. In this manner, both MIOBs can be used to transfer the print job to the second media-handling device.

It is to be understood that various conventional communication techniques between the consumable handling device, data center, and MIOB can be employed. For example, conventional wireless techniques can be employed. Also, a variety of hardwired communication systems can be used.

Figure 2:
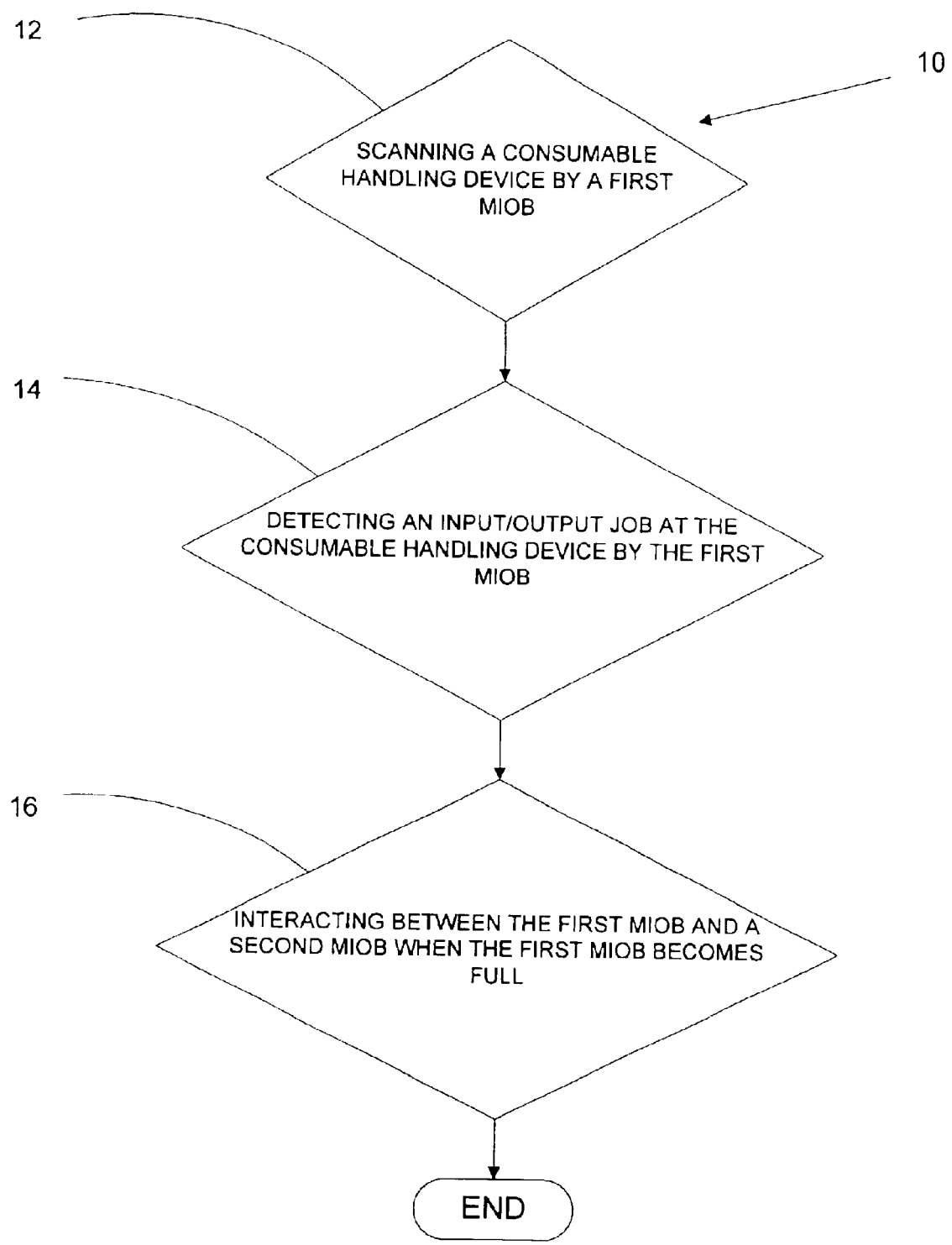
FIG. 2 is a flowchart that an active method for automated input/output job distribution through the use of a self-propelled, mobile input/output bin (MIOB).

The first and second MIOBs can also be utilized in an active manner (FIG. 2). For example, a first MIOB that is solely dedicated to transferring print jobs to copiers constantly moves about and conventionally scans/monitors the various printers and/or printing devices in order to determine if the printer and/or printing device has printed out a print job that is to be copied (Method 10). If the printer and/or printing device have printed out a print job it may, for example, conventionally emit a signal that can be detected by the first MIOB (steps 12 and 14). A second MIOB, that is designated to interrogate other MIOBs for a possible need of assistance, then may conventionally interact with the first MIOB when the first MIOB becomes full, for example (step 16). In this manner, both MIOBs can be used to transfer the print job to the second media-handling device.

It is to be understood that variously equipped MIOBs could be used to roam a particular area and scan/monitor the various consumable handling devices in order to determine if an input/output job exists in any of the consumable handling devices. In fact, such active MIOBs could be utilized in off hours and/or during the weekends in order to service the consumable handling devices without adversely affecting the workforce.

Once given the above disclosure, many other features, modifications or improvements will become apparent to the skilled artisan. Such features, modifications or improvements are, therefore, considered to be part of this invention, the scope of which is to be determined by the following claims.

What is claimed is:

1. A method for automated input/output job distribution, comprising the steps of:

detecting an input/output job at a consumable handling device;

interacting between said consumable handling device and a first self-propelled, mobile input/output bin; and contacting a second self-propelled, mobile input/output bin by said first input/output bin when said first input/output bin becomes full.

2. The method, as in claim 1, wherein said detecting step is further comprised of the step of:

contacting a data center of said input/output job.

3. The method, as in claim 1, wherein said detecting step is further comprised of the step of:

scanning/monitoring said consumable handling device to detect said input/output job.

4. The method, as in claim 1, wherein said consumable handling device is further comprised of:

a printer.

5. The method, as in claim 1, wherein said consumable handling device is further comprised of:

a printing device.

6. The method, as in claim 1, wherein said method is further comprised of the step of:

outfitting said first and second input/output bins with a locking means.

7. The method, as in claim 1, wherein said detecting step is further comprised of the step of:

wirelessly detecting said input/output job.

8. The method, as in claim 1, wherein said interacting step is further comprised of the step of:

wirelessly communicating between said consumable handling device and said first and second input/output bins.

9. The method, as in claim 1, wherein said contacting step is further comprised of the step of:

contacting a data center regarding said input/output job.

10. A method for passively automating an input/output job distribution, comprising the steps of:

detecting an input/output job at a consumable handling device;

contacting a first self-propelled, mobile input/output bin; and interacting said first input/output bin with a second self-propelled, mobile input/output bin when said first input/output bin becomes full.

11. The method, as in claim 10, wherein said consumable handling device is further comprised of:

a printer.

12. The method, as in claim 10, wherein said consumable handling device is further comprised of:

a printing device.

13. The method, as in claim 10, wherein said method is further comprised of the step of:

outfitting said first and second input/output bins with a locking means.

14. The method, as in claim 10, wherein said detecting step is further comprised of the step of:

wirelessly detecting said input/output job.

15. The method, as in claim 10, wherein said contacting step is further comprised of the step of:

wirelessly contacting said first and second input/output bins.

16. The method, as in claim 10, wherein said interacting step is further comprised of the step of:

contacting a data center regarding said input/output job.

17. A method for actively automating an input/output job distribution, comprising the steps of:

scanning/monitoring a consumable handling device by a first self-propelled, mobile input/output bin;

detecting an input/output job at said consumable handling device by said first input/output bin; and interacting said first input/output bin with a second self-propelled, mobile input/output bin when said first input/output bin becomes full.

18. The method, as in claim 17, wherein said consumable handling device is further comprised of:

a printer.

19. The method, as in claim 17, wherein said consumable handling device is further comprised of:

a printing device.

20. The method, as in claim 17, wherein said method is further comprised of the step of:

outfitting said first and second input/output bins with a locking means.

21. The method, as in claim 17, wherein said detecting step is further comprised of the step of:

wirelessly detecting said input/output job.

22. The method, as in claim 17, wherein said scanning/monitoring step is further comprised of the step of:

wirelessly contacting said consumable handling device.

23. The method, as in claim 17, wherein said interacting step is further comprised of the step of:

contacting a data center regarding said input/output job.

* * * * *